Dec. 18, 1951 R. E. J. NORDQUIST 2,578,732
FILLING MACHINE WITH RECIPROCATING PISTONS OPERATING
WITHIN RECIPROCATING MEASURING CHAMBERS
Filed Dec. 30, 1947 3 Sheets-Sheet 2
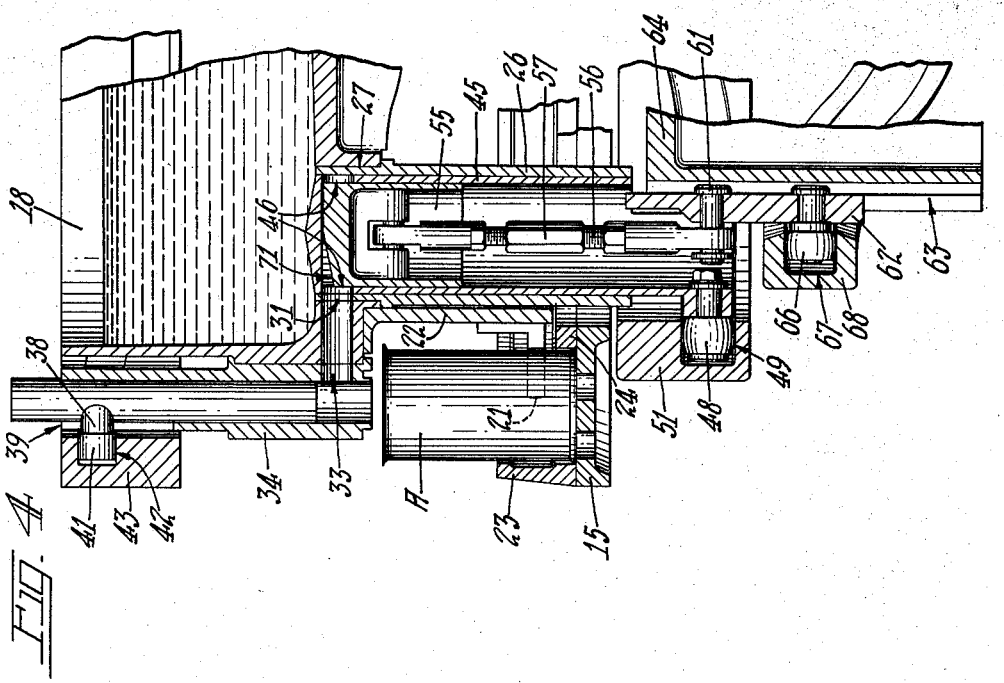
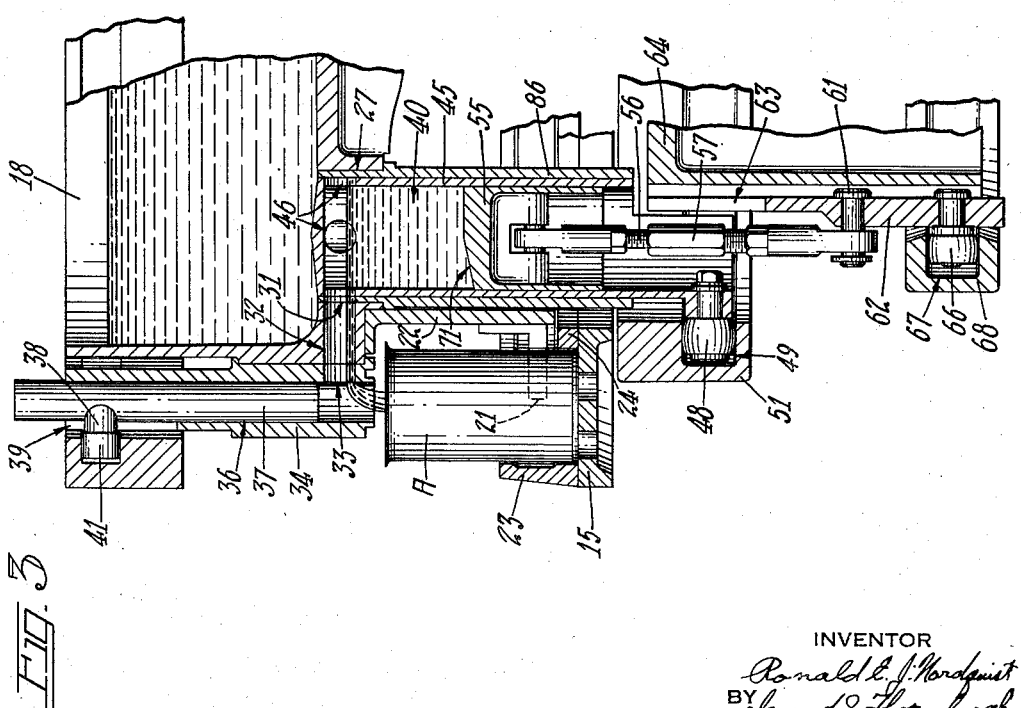
INVENTOR
Ronald E. J. Nordquist
BY
ATTORNEYS Dec. 18, 1951 R. E. J. NORDQUIST 2,578,732
FILLING MACHINE WITH RECIPROCATING PISTONS OPERATING
WITHIN RECIPROCATING MEASURING CHAMBERS
Filed Dec. 30, 1947 3 Sheets-Sheet 3

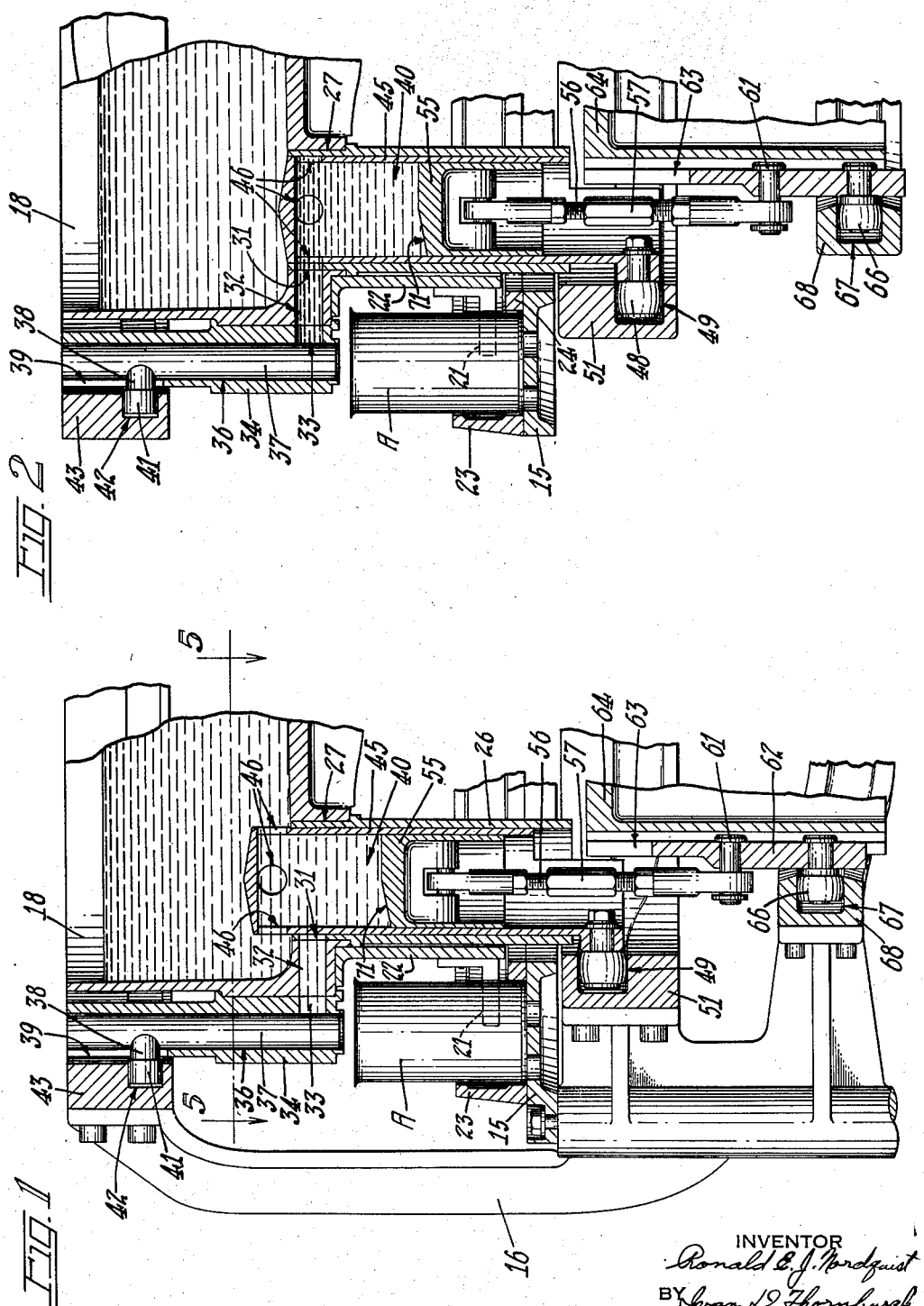

INVENTOR
Ronald E. J. Nordquist
BY Ivan D. Hornburgh
Charles H. Erne
ATTORNEYS

Patented Dec. 18, 1951

2,578,732

UNITED STATES PATENT OFFICE 2,578,732

FILLING MACHINE WITH RECIPROCATING PISTONS OPERATING WITHIN RECIPROCATING MEASURING CHAMBERS

Ronald E. J. Nordquist, Maplewood, N. J., assignor to American Can Company, New York, N. Y., a corporation of New Jersey Application December 30, 1947, Serial No. 794,693

7 Claims. (Cl. 226—103)

The present invention relates to machines for filling measured charges of liquid into cans or containers and has particular reference to an improved measuring and filling head used in such a machine.

An object of the invention is the provision in a liquid filling machine of measuring devices the construction of which readily lends itself to tighter, leakproof joints between the movable parts contacting the liquid, the parts being easily assembled and insuring accuracy of measuring and of filling the liquid into containers.

Another object is the provision of such measuring devices which are applicable to filling containers with only a small amount of liquid such as syrups, brine or other suitable canning liquid as well as for filling containers where a large quantity of liquid is required, the measuring chamber being adjustable for different volumes of liquid.

Numerous other objects and advantages of the invention will be apparent as it is better understood from the following description, which, taken in connection with the accompanying drawings, discloses a preferred embodiment thereof.

Referring to the drawings:

Figure 1 is a sectional view of a can filling machine embodying the instant invention, with parts broken away;

Figs. 2, 3 and 4 are views similar to Fig. 1, the different views showing the movable parts of the machine in different positions.

Figure 5:
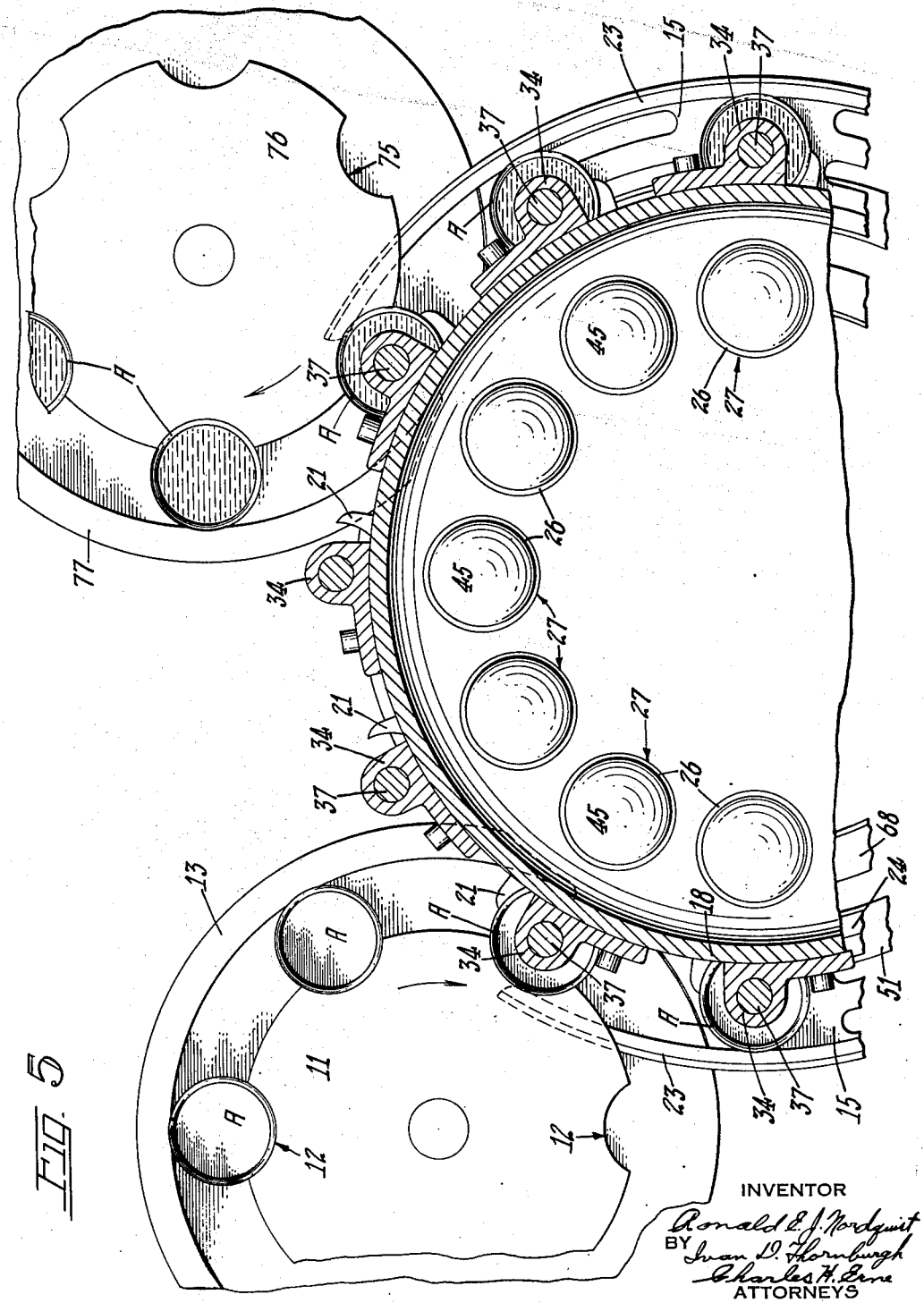
Fig. 5 is a top plan section taken substantially along the line 5—5 of Fig. 1.

As a preferred embodiment of the instant invention the drawings illustrate principal parts of a machine for filling liquids into cans, such as for example, the machine disclosed in United States Patent 1,506,851, issued September 2, 1924, to T. Martin et al. on Filling Machine. In such a machine cans A disposed in an upright position and moving in a continuous procession are fed into the machine by a continuously rotating turret 11 (Fig. 5) having spaced pockets 12 for advancing the cans in timed order. The turret is rotated in any suitable manner in time with the other moving parts of the machine. Curved guide rails 13 disposed adjacent the outer periphery of the turret retain the cans in their pockets.

A can A advanced by the turret 11 is received in the machine on a stationary table 15 (Figs. 1 and 5) secured to a frame 16 which constitutes the main frame of the machine. The table extends around the machine along a circular path of travel below a rotatable reservoir 18 mounted in the machine frame as disclosed in the above mentioned Martin patent. The reservoir is rotated continuously in any suitable manner and contains a liquid such as fruit juices, brines, syrups, canning liquids, carbonated beverages or the like to be filled into the cans.

The cans A received on the table 15 are propelled therealong in spaced and timed order by spaced feed fingers 21 which project laterally from depending brackets 22 secured to the bottom of the reservoir. A pair of spaced and parallel curved guide rails 23, 24 secured to the table 15 maintain the cans in line as they travel along the table with the reservoir.

During the travel of a can A along the table 15 it is filled with a measured charge of the liquid retained in the reservoir 18. For this purpose the machine is provided with a plurality of discharge cylinders 26 which depend vertically from the bottom of the reservoir and which are located one adjacent each of the can propelling fingers 21 on the reservoir. These discharge cylinders are open at both ends. The upper end of each cylinder is secured in a tight fitting bore 27 formed in the bottom of the reservoir, with the open end of the cylinder in communication with the interior of the reservoir.

Adjacent its upper end, each discharge cylinder 26 is formed with a discharge outlet 31 (Figs. 1, 2, 3 and 4) which communicates with a horizontal discharge channel 32 formed in the bottom of the reservoir 18. There is one discharge channel for each cylinder. The outer end of each of the discharge channels 32 aligns with a continuing channel 33 formed in an outlet valve housing 34 bolted to the outer peripheral face of the reservoir (see also Fig. 5). There is one valve housing 34 for each cylinder 26 and each housing is formed with a vertical bore 36 having a vertically movable plunger valve 37 located in vertical alignment with a can A being propelled by a finger 21 on the reservoir. This plunger normally extends down past the discharge channel 33 and normally closes off this channel. Thus this outlet valve is in a normally closed position over the can.

The upper end of the plunger valve 37 is formed with a boss 38 which operates in a vertical slot 39 in the valve housing 34 to prevent rotation of the valve. The boss extends beyond the housing and carries a cam roller 41 which operates in a cam groove 42 of a stationary cam 43 which encircles the reservoir 18 and which is secured to the frame 16.

Hence as the reservoir 18 rotates, the cam rollers 41 on the outlet valves 37 traverse the cam groove 42 and raise and lower the valves at the proper time to open and close them for filling the cans A with the liquid from the reservoir as will be hereinafter more fully explained.

The liquid filled into each can A is accurately measured before being discharged into the can. For this purpose each discharge cylinder 26 is equipped with a measuring cylinder 45 which is slideably disposed within the discharge cylinder and which encloses a measuring chamber 40. The upper ends of the measuring cylinders are closed and are formed with a plurality of inlet ports 46, one of which is substantially the same size as the discharge outlet 31 in the discharge cylinder 26 and is vertically alignable with this outlet.

The lower end of each of the measuring cylinders 45 is open and extends down below the discharge cylinder. Each measuring cylinder at its lower end carries a cam roller 48 which operates in a cam groove 49 formed in a stationary cam 51 disposed immediately below the can support table 15. This cam encircles the machine and is secured to the machine frame 16. The cam is shaped to raise and lower the measuring cylinders 45 within their supporting discharge cylinders 26 at the proper time as the cam rollers traverse the cam groove during rotation of the reservoir for admitting a measured charge of liquid from the reservoir into the measuring cylinders and to segregate these charges from the reservoir for filling into the cans as will be fully explained hereinafter.

The capacity of the measuring chamber 40 in a measuring cylinder 45 is defined by the interior top and side walls of the cylinder and by a piston 55 which is slideably disposed within each of the measuring cylinders. The pistons are movable to a predetermined position in the cylinders for providing a predetermined capacity of the measuring chambers 40. Each piston is pivotally connected to the upper end of an adjustable connecting rod 56 having a turnbuckle 57 for manually shifting the piston in its measuring cylinder for changing the capacity of the measuring chamber to fit the can to be filled.

The lower ends of the connecting rods 56 are mounted on pivot pins 61 secured in vertical slides 62 slideably disposed in vertical slideways 63 formed in the outer periphery of a drum 64 bolted to and rotating with the reservoir 18. There is one slide 62 for each piston. These slides carry cam rollers 66 which operate in a cam groove 67 of a stationary cam 68 which encircles the drum 64 and which is bolted to the frame 16. The cam is shaped to raise and lower the pistons 55 at the proper time as the cam rollers traverse the cam groove during rotation of the reservoir to produce the full capacity of the measuring chambers 40, and to force the measured and segregated charge of liquid out of the measuring chambers into the waiting cans as will now be explained in detail.

In the operation of the machine, the measuring of the charge of liquid to be filled into a can preferably begins before the can to be filled is received in the machine so that as much as possible of the travel of the can while under an outlet valve 37 may be devoted to filling the can. This measuring operation takes place while the outlet valve 37 is closed, as shown in Fig. 1. At the beginning of the measuring operation the measuring cylinder 45 and the piston 55 are in the position shown in Fig. 4. Lifting of the measuring cylinder is the first action in the measuring operation, but it will be understood that this is after the valve 37 has been lowered from the position shown in Fig. 4, preparatory to the measuring operation.

The measuring cylinder 45 is first raised only far enough for the bottom of one of its ports 46 to be still in communication with the discharge outlet 31 of the discharge cylinder 26. In this partially raised position the tops of the several ports 46 allow the reservoir liquid to flow into the measuring cylinder above the upper face of the stationary piston 55. Liquid first flows into and fills the discharge outlet 31 and the discharge channel 32, displacing the air from these members. The displaced air escapes as bubbles passing by way of the aligned discharge outlet 31 and port 46 through the liquid in the reservoir 18.

This action is very rapid and is followed immediately by the further lifting of the measuring cylinder into its uppermost position. In the raised position of the measuring cylinder, the side wall of the cylinder blocks off the discharge outlet 31. At the same time the piston 55 is lowered drawing in the liquid to fill the space above the piston and inside of the measuring cylinder. This is the position of parts shown in Fig. 1.

During this descent of the piston liquid from the reservoir flows through the exposed ports 46 into the measuring chamber being created and follows the piston until the piston reaches the predetermined position shown in Fig. 1 and thus provides the full capacity of the measuring chamber 40. By the time the piston reaches this predetermined position, the measuring chamber is completely filled with liquid.

After a predetermined travel of the reservoir 18 to insure full descent of the piston 55 to its full chamber producing position, the cams 51, 68 lower the measuring cylinder 45 and its piston 55 in unison until the top of the measuring cylinder is substantially flush with the interior surface of the bottom of the reservoir as best shown in Fig. 2. During this lowering of the cylinder and piston the ports 46 in the cylinder move down into the discharge cylinder 26 and are thereby cut off from communication with the reservoir, one of the ports coming into alignment or register with the discharge outlet 31 as shown in Fig. 2. During this descent of the cylinder there is a short overlapping of the one port 46 and the discharge outlet 31. The liquid in the measuring chamber is allowed to join with the liquid in the channels 32, 33 and these two bodies of liquid become a part of the measured charge of liquid.

With the measuring cylinder in its lowermost position as shown in Fig. 2 the measured charge of liquid is segregated from the liquid in the reservoir and is thus ready to be discharged into the waiting can moving with the rotating reservoir and located under the outlet valve 37. The outlet valve 37 is then opened by its cam 43 to a position shown in Fig. 3 so that the outlet channel 33 is unobstructed. This permits the segregated measured charge of liquid to flow from the measuring chamber into the can.

To facilitate this discharge of the charge of liquid into the can, the piston 55 is now moved up, under the action of its cam 68, within its measuring cylinder 45 while the cylinder remains stationary and thus forces the charge of liquid out of the measuring chamber into the can. This upward travel of the piston continues until it reaches the top of the measuring cylinder as shown in Fig. 4 so that the segregated measured charge of liquid is completely discharged into the can. The top of the pistons 55 are formed with a beveled section 71 to facilitate this complete discharge of the liquid.

This completes the filling cycle of the machine and the outlet valve 37 acting under its cam 43 thereupon closes and the piston 55 and the measuring cylinder 45 remain in position in readiness for a repeat cycle for measuring and segregating another charge of liquid for another can. The measuring cylinders and their pistons thus operate in timed order on the cans as they come into the machine in a continuous procession and thus provide a continuously operating machine.

Upon completion of the filling cycle, a filled can A is engaged in a pocket 75 of a discharge turret 76 disposed adjacent the path of travel of the cans and is carried away to any suitable place of deposit for sealing. Curved guide rails 77 retain the filled cans in the turret pockets during this transfer.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container filling machine comprising a reservoir for retaining a quantity of liquid for filling into containers, a discharge cylinder carried by said reservoir with one end opening into the reservoir and having an outlet for discharging liquid into a waiting container, a measuring cylinder longitudinally movable and concentrically disposed in said discharge cylinder and having an open port communicable with the interior of said reservoir in one position of said measuring cylinder for admitting a measured quantity of liquid thereinto and alignable with said outlet in the discharge cylinder in another position of said measuring cylinder for segregating the measured quantity of liquid from said reservoir for discharge from the measuring cylinder, and a piston concentrically disposed in said measuring cylinder and movable along the common axis for forcing the segregated measured charge of liquid therefrom through said aligned port and discharge outlet.

2. In a container filling machine, the combination of a reservoir for retaining a quantity of liquid for filling into containers, a discharge cylinder carried by said reservoir with one end opening into the reservoir and having an outlet for discharging liquid into a waiting container, a measuring cylinder closed at one end and movable longitudinally of said discharge cylinder and having an open port adjacent its closed end and communicable with the interior of said reservoir by insertion of its closed end into the reservoir for admitting a measured quantity of liquid thereinto, said measuring cylinder by withdrawal from the reservoir being aligned with said outlet in the discharge cylinder for segregating the measured quantity of liquid from said reservoir for discharge from the measuring cylinder, and a piston disposed in measuring position within said measuring cylinder and movable therewith for defining and maintaining the capacity of said measuring cylinder, said piston also being movable toward the closed end of said measuring cylinder when said port and said discharge outlet are in register for forcing the segregated measured charge of liquid therefrom into the container.

3. In a container filling machine, the combination of a rotatable reservoir for retaining a quantity of liquid for filling into containers, a plurality of outlet valves carried on said reservoir adjacent its outer periphery, feeding means for propelling containers in a continuous procession into alignment with said outlet valves for filling, a plurality of discharge cylinders depending from said reservoir in communication therewith and located one adjacent each outlet valve, each cylinder having a discharge outlet communicating with its adjacent outlet valve, a measuring cylinder movably disposed in each of said discharge cylinders and having an open port formed in a portion thereof, said portion being projectable into said reservoir for admitting a charge of liquid through said port into said measuring cylinder, said port being alignable with said discharge outlet in another position of said measuring chamber segregating the charge of liquid from said reservoir for filling into a container, a piston movably disposed in each of said measuring cylinders, cam means operable against said measuring cylinder for moving it within said discharge cylinder for the reception and the discharge of the charge of liquid, auxiliary cam means operable against said piston and moving said piston with said measuring cylinder for holding said piston fixed in said measuring cylinder for defining a predetermined measuring chamber therein for the reception of the liquid and moving said piston relative to said measuring cylinder for discharging the received liquid from the cylinder, and cam means operable against said outlet valves for opening and closing the valves in time with the operation of said piston for discharging the charge of liquid into a container.

4. In a container filling machine, the combination of a rotatable reservoir for retaining a quantity of liquid for filling into containers, a plurality of outlet valves carried on said reservoir adjacent its outer periphery, feeding means for propelling containers in a continuous procession into alignment with said outlet valves for filling, a plurality of discharge cylinders depending from said reservoir in communication therewith and located one adjacent each outlet valve, each cylinder having a discharge outlet communicating with its adjacent outlet valve, a measuring cylinder movably disposed in each of said discharge cylinders and having an open port formed in a portion thereof, said portion being projectable into said reservoir for admitting a charge of liquid through said port into said measuring cylinder, said port being alignable with said discharge outlet in another position of said measuring cylinder segregating the charge of liquid from said reservoir for filling into a container, a piston disposed in said measuring cylinder in a predetermined location therewith and movable therewith for defining and maintaining the capacity of said measuring cylinder, said piston also being movable relative to said measuring cylinder when said port and said discharge outlet are in register for forcing the segregated measured charge of liquid therefrom into the container, and actuating means for shifting said measuring cylinders, said pistons and said outlet valves in time with each other and the rotation of said reservoir.

5. In a container filling machine, the combination of a reservoir for retaining a quantity of liquid for filling into containers, a discharge cylinder carried by said reservoir with one end opening into the reservoir and having an outlet for discharging liquid into a waiting container, a measuring cylinder concentrically disposed in said discharge cylinder and having an open port, actuating means operable against said measuring cylinder for moving it within said discharge cylinder to first present its open port to the interior of said reservoir for admitting liquid into a measuring chamber formed in said measuring cylinder and subsequently to break the connection between chamber and reservoir for segregating a measured quantity of liquid from the liquid in said reservoir and to align said measuring cylinder port with said outlet in the discharge cylinder for discharge of the measured liquid from the measuring cylinder, a piston concentrically disposed in said measuring cylinder and forming an end wall of the measuring chamber, and auxiliary actuating means connecting with said piston and operable for moving the piston in said measuring cylinder to first establish said measuring chamber and later for moving the piston in unison with said measuring cylinder for maintaining the measuring chamber capacity in said cylinder during the segregation of the measured charge of liquid thereinto, said auxiliary actuating means subsequently moving said piston relative to said measuring cylinder for contracting said measuring chamber to discharge the received charge of liquid into a container.

6. In a container filling machine, the combination of a reservoir for retaining a quantity of liquid for filling into containers, a discharge cylinder carried by said reservoir with one end opening into the reservoir and having an outlet for discharging liquid into a waiting container, a measuring cylinder disposed in said discharge cylinder, said measuring cylinder having one end closed and an open port adjacent its closed end, means for sliding said measuring cylinder in one direction longitudinally of said discharge cylinder to project the closed end and the open port of said measuring cylinder into said reservoir for admitting liquid into said measuring cylinder, said means also acting to slide said measuring cylinder in an opposite direction to withdraw said closed end and said open port from said reservoir and to align said open port with the outlet in said discharge cylinder, a piston disposed in said measuring cylinder, and means for reciprocating said piston in said measuring cylinder to produce a measuring chamber of a predetermined capacity therein for measuring the quantity of liquid admitted into said measuring cylinder and for discharging the measured charge of liquid from said measuring cylinder through the aligned open port and outlet.

7. In a container filling machine, the combination of a reservoir for retaining a quantity of liquid for filling into containers, a discharge cylinder carried by said reservoir with one end opening into the reservoir and having an outlet for discharging liquid into a waiting container, a measuring cylinder disposed in said discharge cylinder, said measuring cylinder having one end closed and an open port adjacent its closed end, means for sliding said measuring cylinder in one direction longitudinally of said discharge cylinder to project the closed end and the open port of said measuring cylinder into said reservoir for admitting liquid into said measuring cylinder, said means also acting to slide said measuring cylinder in an opposite direction to withdraw said closed end and said open port from said reservoir and to align said open port with the outlet in said discharge cylinder, a piston disposed in said measuring cylinder, means for reciprocating said piston in said measuring cylinder to produce a measuring chamber of a predetermined capacity therein for measuring the quantity of liquid admitted into said measuring cylinder and for discharging the measured charge of liquid from said measuring cylinder through the aligned open port and outlet, and means for adjusting said piston relative to said measuring cylinder for changing the capacity of said measuring chamber.

RONALD E. J. NORDQUIST.

REFERENCES CITED

The following references are of record in the file of this patent:

UNITED STATES PATENTS

| Number | Name | Date |
|---|---|---|
| 1,400,034 | Dilley | Dec. 13, 1921 |
| 1,506,851 | Martin | Sept. 2, 1924 |
| 1,570,151 | Holmquist | Jan. 19, 1926 |
| 1,735,390 | Henderson | Nov. 12, 1929 |
| 1,852,308 | Judge | Apr. 5, 1932 |
| 1,946,025 | Lewis | Feb. 6, 1934 |
| 1,947,535 | Schmidt | Feb. 20, 1934 |
| 1,956,595 | Schmidt | May 1, 1934 |
| 2,086,890 | Ashlock et al. | July 13, 1937 |
| 2,103,817 | Johnson | Dec. 28, 1937 |
| 2,144,628 | Hothersall | Jan. 24, 1939 |
| 2,220,707 | Chapman | Nov. 5, 1940 |
| 2,276,157 | Chapman | Mar. 10, 1942 |
| 2,299,003 | Baldwin | Oct. 13, 1942 |